(12) United States Patent
Klingels (10) Patent No.: US 9,399,924 B2
(45) Date of Patent: Jul. 26, 2016

(54) SEGMENTED COMPONENT

(71) Applicant: MTU Aero Engines GmbH, Munich (DE)

(72) Inventor: Hermann Klingels, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 740 days.

(21) Appl. No.: 13/624,648

(22) Filed: Sep. 21, 2012

(65) Prior Publication Data

US 2013/0084166 A1  Apr. 4, 2013

(30) Foreign Application Priority Data

Sep. 30, 2011  (DE) .................. 10 2011 083 814

(51) Int. Cl.
  *F01D 11/00* (2006.01)
  *F02C 7/28* (2006.01)
(52) U.S. Cl.
  CPC ............... *F01D 11/005* (2013.01); *F02C 7/28* (2013.01); *F05D 2240/11* (2013.01); *F05D 2240/56* (2013.01); *Y02T 50/671* (2013.01)
(58) Field of Classification Search
  CPC ........................................... F01D 11/005
  USPC ........................................... 415/214.1
  See application file for complete search history.

(56) References Cited

U.S. PATENT DOCUMENTS

| | | | | |
|---|---|---|---|---|
| 4,730,876 A * | 3/1988 | Werner et al. | .................. | 300/2 |
| 4,781,388 A | 11/1988 | Wöhrl et al. | | |
| 5,181,728 A * | 1/1993 | Stec | .................. | 277/355 |
| 5,357,744 A * | 10/1994 | Czachor | .................. | F01D 9/065 |
| | | | | 415/134 |
| 5,451,116 A | 9/1995 | Czachor et al. | | |
| 5,480,162 A * | 1/1996 | Beeman, Jr. | .................. | 277/355 |
| 6,010,132 A | 1/2000 | Bagepalli et al. | | |
| 6,139,263 A | 10/2000 | Klingels | | |
| 6,681,486 B2 | 1/2004 | Flower | | |
| 6,932,347 B2 | 8/2005 | Beichl et al. | | |
| 7,128,323 B2 * | 10/2006 | Iguchi | .................. | F16J 15/0887 |
| | | | | 277/530 |
| 7,249,769 B2 | 7/2007 | Webster | | |
| 7,832,734 B2 * | 11/2010 | Beichl et al. | .................. | 277/355 |
| 2003/0131602 A1 | 7/2003 | Ingistov | | |
| 2006/0055118 A1* | 3/2006 | Beichl | .................. | 277/346 |
| 2008/0199307 A1 | 8/2008 | Keller | | |

FOREIGN PATENT DOCUMENTS

| | | |
|---|---|---|
| CH | 41 159 A1 | 6/1907 |
| DE | 35 14 382 C1 | 6/1986 |
| DE | 196 28 559 A1 | 1/1998 |
| DE | 198 07 247 A1 | 9/1999 |
| DE | 101 22 732 A1 | 11/2002 |

(Continued)

OTHER PUBLICATIONS

EPO Search Report dated Mar. 3, 2014 with Statement of Relevancy (Seven (7) pages).

*Primary Examiner* — Richard Edgar
(74) *Attorney, Agent, or Firm* — Crowell & Moring LLP (57) ABSTRACT

A component, in particular for a gas turbine, is disclosed. The component has at least two component segments which are arranged relative to one another leaving a gap and are sealed against each other by a sealing device. The sealing device includes at least one brush seal. Also disclosed is a gas turbine, in particular an aircraft engine, having such a component.

8 Claims, 4 Drawing Sheets

(56) References Cited

FOREIGN PATENT DOCUMENTS

| | | |
|---|---|---|
| DE | 103 26 540 A1 | 1/2005 |
| DE | 103 51 583 A1 | 6/2005 |
| DE | 10 2004 025 142 A1 | 12/2005 |
| DE | 600 20 884 T2 | 5/2006 |
| DE | 601 16 455 T2 | 7/2006 |
| DE | 10 2005 006 939 A1 | 8/2006 |
| DE | 10 2007 010 378 A1 | 9/2008 |
| EP | 0 840 042 A2 | 5/1998 |
| EP | 1 398 569 A1 | 3/2004 |
| EP | 1 918 523 A2 | 5/2008 |
| GB | 2 393 223 A | 3/2004 |
| JP | 2002-81552 A | 3/2002 |
| JP | 2005-155760 A | 6/2005 |
| WO | WO 2004/111507 A1 | 12/2004 |
| WO | WO 2012/082805 A2 | 6/2012 |

\* cited by examiner

SEGMENTED COMPONENT

This application claims the priority of German Patent Document No. DE 10 2011 083 814.7, filed Sep. 30, 2011, the disclosure of which is expressly incorporated by reference herein.

BACKGROUND AND SUMMARY OF THE INVENTION

The invention relates to a segmented component as well as a gas turbine having this type of component.

Gas channels are arranged between the turbo engines of a gas turbine. In the regions of a turbine in which no cooling is required, e.g., in the compressor area and at the outlet of a low-pressure turbine, these gas channels are often an integral constituent part of a housing. Examples of this are, for instance, a compressor center frame or turbine exhaust casing. In the range of high-operating temperatures, these gas channels are often segmented for mechanical reasons. Especially support structures, so-called hot struts or mid-turbine frames, which are arranged between the turbines in which structural struts, supply lines and the like cross the flow of hot gas, must be protected from high temperatures that prevail in the gas channel when the gas turbine is in operation. Normally the gas channels in this case are formed of segmented covering parts, so-called fairings, and/or gas channel wall parts or so-called panels. The outside of these segmented components is surrounded by cooling and/or sealing air. This cooling and sealing air has a higher pressure than the hot gas located in the gas channel. This makes it possible to prevent hot gas from the gas channel from escaping through gaps between the component segments to the outside. Instead, because of its higher pressure, the cooling and/or sealing air flows through the leakage points into the gas channel through which hot air flows.

Figures 1, 2:
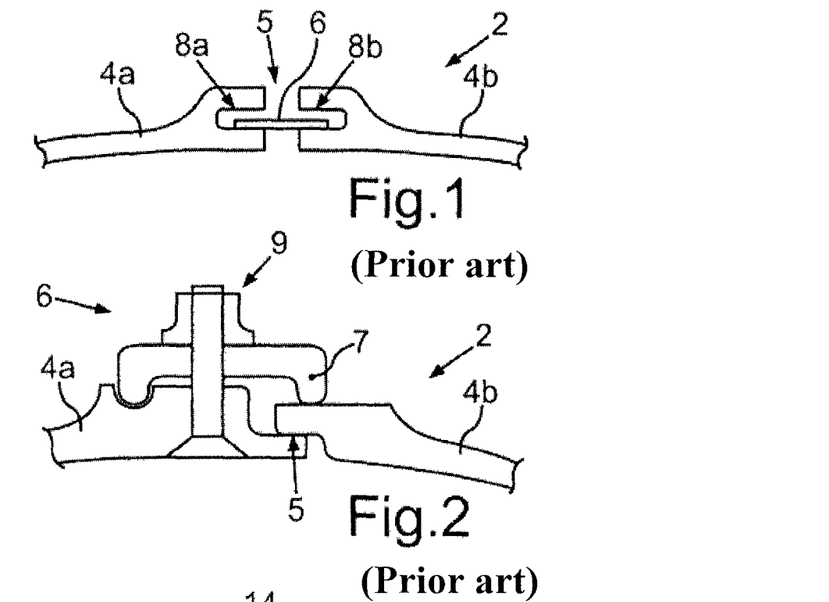
FIG. 1 is a schematic lateral sectional view of a segmented component known from the prior art.
FIG. 2 is a schematic lateral sectional view of another component known from the prior art.

In order to keep the consumption of cooling and/or sealing air as low as possible, seal devices are provided at the leakage points, e.g., the edges of the component segments, which seal the gap between the component segments. In this case, various embodiments of these sealing devices are known from the prior art. A schematic lateral sectional view of a component 2, known from the prior art, is illustrated in FIG. 1, wherein the component 2 includes a sealing point of a gas channel of a gas turbine. The component 2, which is configured as a covering (fairing) of a gas channel of a gas turbine, has two component segments—4a, 4b—which are sealed against one another to reduce the leakage flow through a gap 5 between the component segments 4a, 4b by means of a sealing element 6 configured as a sheet-metal strip (a so-called sealing strip). The sheet-metal strip 6 extends between corresponding grooves 8a, 8b on the edges of the component segments 4a, 4b. The component segments 4a, 4b may be both a covering (fairing) as well as a gas channel wall part (panel). However, the disadvantage of this component 2, or this sealing device 6, is that impermeability is inadequate especially under changing operating conditions.

FIG. 2 shows a schematic lateral view of another example of a component 2 known from the prior art, in which the edges of its component segments 4a, 4b overlap. The component segments 4a, 4b are ground in the region of their overlapping locations (ground overlap). The sealing device 6 includes a clamping claw 7, which is fastened to the component segment 4a via a nut-and-bolt connection 9 and via which the component segments 4a, 4b are pressed together with virtually no play with a defined preload force. The component segments 4a, 4b are able to move relative to one another other in the circumferential direction without changing the gap. However, the manufacturing expense for this component 2 is substantial, whereby correspondingly high fabrication and maintenance costs are incurred. In addition, there is a high occurrence of wear.

A gas turbine with a gas channel is known from U.S. Pat. No. 5,451,116 A, which is also made or formed of segmented components (fairings and panels). The sealing surfaces of the adjacent component segments are pressed against each other, similar to the depiction in FIG. 2, by means of tripod plates.

The object of the present invention is creating a segmented component, which also has a lower leakage rate under changing operating conditions and in addition, can also be manufactured more cost-effectively. A further object of the invention is making available a gas turbine with such a component.

Advantageous embodiments with expedient further developments of the invention are disclosed in the respective dependent claims, wherein advantageous embodiments of the component are to be considered as advantageous embodiments of the gas turbine and vice versa.

A component, which has a lower leakage rate even under changing operating conditions and is also simpler and more cost-effective to manufacture, is created in accordance with the invention in that the sealing device has at least one brush seal. In this case, the wire pack of the brush seal produces a sealing effect in that inflowing gas is forced to flow through the wire pack of the brush seal. In doing so, this flow of gas causes a compression of the wire pack and thereby automatically increases the sealing effect of the brush seal by closing the free spaces between the wires. Basically, the wire packs of the brush seal are able to be deformed relatively easily so that a high sealing effect of the sealing device is reliably guaranteed even under changing operating conditions, e.g., due to fluctuating ambient temperatures and pressures and in the case of thermally or mechanically deformed contact surfaces. In contrast to the prior art, the component is also able to be used without a problem in high-temperature ranges, because no screwed connections or the like are required. In addition, brush seals are able to be mounted and replaced easily, thereby producing corresponding cost advantages in the production and repair of the component. Further cost advantages are produced because a reliable seal can also be produced between component segments having irregular surfaces. For example, the brush seal also makes it possible to reliably seal cast surfaces without post-processing and smoothing. In addition, brush seals have a very low weight as well as a low requirement for installation space, whereby the component is able to be adapted in a simpler way to the different requirement profiles and intended uses. Other advantages include low wear at the sealing point.

An advantageous embodiment of the invention provides that the brush seal includes a wire pack, which is wound around a core wire and fixed on the core wire by a clamping tube. Such a brush seal is flexible and can be manufactured simply and cost-effectively. Depending upon the intended use of the component, wires of the wire pack may be made, for example, of a metal or a metal alloy and/or of a non-metallic material such as aramid, whereby the sealing device is adaptable in an optimal way. In addition, the length of the wire pack may be varied in an especially simple manner so that it is possible to seal any spatially desired component segment geometries.

Additional advantages are produced if the wire pack of the brush seal is arranged at an angle between 0° and 80°, in particular between 30° and 60°, to the associated sealing surface thereof. In this case, particularly angles of 0°, 5°, 10°, 15°, 20°, 25°, 30°, 35°, 40°, 45°, 50°, 55°, 60°, 65°, 70°, 75° or 80°, along with corresponding intermediate angles, are to be understood as an angle between 0° and 80°. In this case, the angle may be determined in both a clockwise and counter-clockwise manner. This type of brush seal makes it possible to compensate especially well for thermally or mechanically induced relative movements of the component segments due to the pliability of the wires. In addition, a simple adaptability to different component segment geometries is produced because of this.

It is provided in another embodiment of the invention that the brush seal is arranged in sections in a groove of at least one component segment and/or rests laterally on at least one of the component segments. In this case, a groove permits an especially simple mounting and dismounting of the brush seal. In addition, sides surfaces of the groove may also be used as contact surfaces for the wire pack so that the brush seal seals reliably even under changing internal and external pressure conditions. As a result, the term "groove" should also be understood within the scope of the invention as a guide groove. Because the brush seal rests laterally on one of the component segments, relative movements between the component segments are able to be compensated for especially well since not the tips of the wires but the entire side surface of the wire pack of the brush seal is able to function as a sealing surface.

In another embodiment of the invention, the sealing device includes a holding element, in particular a holding plate, by means of which the brush seal is fixed on at least one of the component segments. In this connection, the brush seal is able to be fixed on the component simply and in an operationally reliable manner. In particular, a holding element configured as a holding plate constitutes an especially cost-effective means of fixing the brush seal at least indirectly.

Another advantageous embodiment of the invention provides that the holding element is fixed on a component segment and/or is arranged at least in sections in a groove of a component segment and/or wraps around the brush seal. This makes it possible for the holding element to be fastened quickly, flexibly and cost-effectively on the component or the component segment. For example, the holding element may be screwed or riveted to at least one component segment. In addition, the holding element is fixed frictionally in the groove of the component, for example, by a press fit. Alternatively or additionally, the holding element may be fastened to the component segment in question by simple bending or crimping.

A reliable sealing effect is ensured even with great pressure differences between the inside and outside of the component in another embodiment of the invention by the sealing device, including a guide element for supporting the wire pack of the brush seal.

Additional advantages are produced in that the sealing device includes a seal carrier on which the brush seal is fixed. This makes it possible to position the brush seal in an especially variable manner. The seal carrier may be screwed, riveted and/or welded to the associated component segment, for example.

Another advantageous embodiment of the invention provides that the seal carrier is fixed on one of the component segments. This constitutes a structurally simple possibility of also fastening the brush seal indirectly on the component or on the component segment.

An especially stable connection of the component segments along with a low leakage rate is achieved in another embodiment of the invention in that one of the component segments and the seal carrier form a groove, in which the adjacent component segment is arranged at least in sections.

In other words, it is provided that the seal carrier and one of the component segments form a groove in the mounted state into which the component segment functioning as a sealing partner is inserted to mount the component.

Another advantageous embodiment of the invention provides for the component segments to be slid on top of one another and/or be inserted into one another and/or be arranged at a distance from one another. This permits an especially flexible connection of the two component segments as well as a simple adaptability of the geometry of the gap left between the component segments.

Another embodiment of the invention provides that the component segments are moveable relative to each other, wherein the brush seal is designed to seal the component segments against each other within a predetermined operating parameter range of the component. In this case, in the scope of the present invention, the term "movable" characterizes merely minor relative movements. In other words, the component segments of the component are to be considered as being essentially stationary in relation to each other. In contrast to component segments that are permanently connected with one another, e.g., welded, the component according to the invention however continues to permit certain relative movements between the individual component segments so that the development of thermally or mechanically induced stress is reliably prevented. The brush seal is designed in this case so that, taking all manufacturing tolerances and all permissible relative movements of the component segments into account, it still touches the contact surfaces of the component segments even in the most unfavorable operating case. The gap between the component segments is thereby reliably sealed over the entire permissible operating range of the component.

In a further advantageous embodiment of the invention, the component is configured as a covering part (fairing) and/or as a gas channel wall part (panel) and/or as a diffuser and/or as a guide vane assembly for a gas turbine. This makes it possible to achieve the aforementioned advantages such as, for example, good sealing effect even in the case of thermally or mechanically deformed sealing points, low wear at the sealing points, reduced thermally-induced stress, simple and cost-effective mounting, avoiding screwed connections in the high-temperature range, sealing even on rough surfaces without post-processing of the surfaces in question and reduced production costs even in the case of these sensitive gas turbine components that are relevant for safety. In addition, leakages at sealing points have a considerable negative impact on gas turbines so that improved sealing of the component segments according to the invention significantly increases the efficiency of the system.

A further aspect of the invention relates to a gas turbine, in particular an aircraft engine, having at least one component according to one of the foregoing exemplary embodiments. The embodiments and further developments presented in conjunction with the component according to the invention, as well as the advantages thereof, apply correspondingly to the gas turbine according to the invention.

The fact that the component forms a gas channel in a compressor area and/or in a turbine area of the gas turbine makes it possible for the efficiency of the gas turbine to be increased advantageously because of the reduced leakage flow through the gap between the component segments of the component.

Other features of the invention are disclosed in the claims, the exemplary embodiments as well as on the basis of the drawings. The foregoing features and combinations of features cited in the description, along with the features and combinations of features cited below in the exemplary embodiments, are not just applicable in the respectively disclosed combination, but also in other combinations or alone without leaving the scope of the invention.

DETAILED DESCRIPTION OF THE DRAWINGS

FIG. 1 and FIG. 2, both of which show components 2 known from the prior art, were already described in the introductory section.

Figure 3:
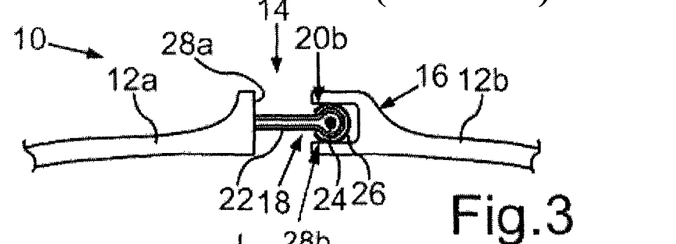
FIG. 3 is a schematic lateral sectional view of a component according to the invention in accordance with a first exemplary embodiment.

FIG. 3 shows a schematic lateral sectional view of a component 10 according to the invention in accordance with a first exemplary embodiment. The component 10, which is configured as a covering part (fairing) for a gas turbine 11 (see FIG. 10), includes two component segments—12a, 12b—which are arranged at a distance from each other leaving a gap 14, and are sealed against each other by a sealing device 16. The sealing device 16 in the depicted exemplary embodiment includes a brush seal 18, which is fixed inside a groove 20b of the second component segment 12b in a leakage-free manner. In the depicted exemplary embodiment, the groove 20b extends only in sections along the longitudinal direction of the brush seal 18 (normal to the drawing plane), thereby achieving a weight-saving design. The brush seal 18 includes a wire pack 22, which is wrapped around a core wire 24 and fixed on the core wire 24 by a clamping plate 26. However, it is also possible for a clamping tube be used to fix the wire pack 22. In addition, the cited individual elements of the brush seal 18 may also be constructed separately or as a single piece. There is also the possibility of using welded brush seals.

The wires tips of the wires of the wire pack 22 of the brush seal 18 are in contact with the associated sealing surface 28a of the component segment 12a. The clamping plate 26 is pressed in the groove 20b against a surface of the component segment 12b so that a secondary sealing surface 28b is formed and gases are forced to flow through the wire pack 22 of the brush seal 18. This gas flow causes a lateral application of the wire pack 22 on the clamping plate 26 with a compression of the wire pack 22 and therewith automatically increases the sealing effect of the brush seal 18. The wire pack 22 of the brush seal 18 in the present case is made of a high-temperature-resistant metal alloy and is able to deform slightly so that the sealing effect of the sealing device 16 is also reliably guaranteed even under operating conditions that change greatly. Therefore, the component segments 12a, 12b are able to move relative to each other to a certain degree without producing an increase in the leakage flow through the gap 14. As an alternative or in addition, the brush seal 18 may also include non-metallic wires or wire packs 22.

In addition, there is a possibility, in accordance with an exemplary embodiment that is not shown, for a holding plate to be configured for the lateral application of the wires or wire pack(s) 22. The holding plate may be welded to the brush seal 18. In order to guarantee the desired holding function, at least one region of the holding plate extends from a region inside the groove 20b to a region projecting into the gap 14. The holding plate in this case is fixed inside the groove 20b.

In contrast to the components 2 depicted in FIG. 1 and FIG. 2, the component 10 may be used in high-temperature ranges of the gas turbine without a problem, because there are no screwed connections or the like. In addition, the brush seal 18 is able to be mounted and dismounted easily, thereby producing corresponding cost advantages in the production and repair of the component 10. Further cost advantages are produced because the sealing effect is also guaranteed even in the case of irregular surfaces on the component segments 12a, 12b. As a result, it is possible to advantageously dispense with post-processing work and smoothing of the surfaces. In addition, the brush seal 18 has a very low weight as well as a low requirement for installation space, which makes it possible to adapt the component 10 in an especially simple manner to different installation space requirements. Additional advantages include low wear at the sealing point.

Figure 4:
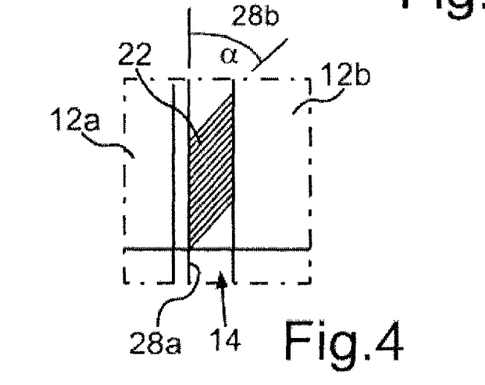
FIG. 4 is a schematic top view of the component depicted in FIG. 3.

FIG. 4 shows a schematic top view of the component 10 depicted in FIG. 3. This figure clearly shows that the wires of the wire pack 22 of the brush seal 18 are arranged at an angle α to the sealing surface 28a. The angle α in the present exemplary embodiment is approx. 45°. Basically, alternative angles α may also be provided, however. Likewise, it may also be provided that the angle α varies along the brush seal 18 so that even component segments 12a, 12b with complex geometries are able to be sealed without a problem.

Figure 5:
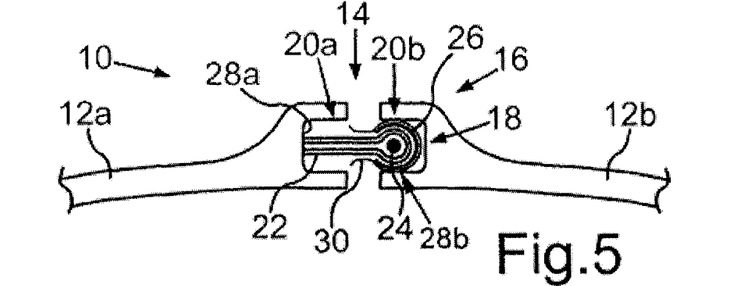
FIG. 5 is a schematic lateral sectional view of the component according to the invention in accordance with a second exemplary embodiment.

FIG. 5 shows a schematic lateral sectional view of the component 10 according to the invention in accordance with a second exemplary embodiment. In contrast to the first exemplary embodiment, the sealing device 16 includes a holding element 30 configured as a holding plate, by means of which the brush seal 18 is fixed leakage-free in the groove 20b of the component segment 12b via a press fit. The holding element 30 in this case wraps around the brush seal 18 and supports the wire pack 22 of the brush seal 18 laterally, thereby reliably preventing a twisting of the brush seal 18 within the groove 20b. The holding element 30 may also be configured as an integral constituent part of the clamping plate 26. This means that the clamping plate 26 does not just exert a clamping function but also a holding function for the brush seal 18 inside the groove 20b. A separate configuration of a holding element 30 is then no longer necessary. In addition, the first component segment 12a also has a groove 20a, which includes the sealing surface 28a for the wire pack 22.

Therefore, even in the case of very large pressure differences, it is not possible to twist or bend the wire pack 22 in such a way that it would no longer lie against the sealing surface 28a. This ensures especially reliable sealing of the gap 14 even in the case of extreme operating conditions.

Figure 6:
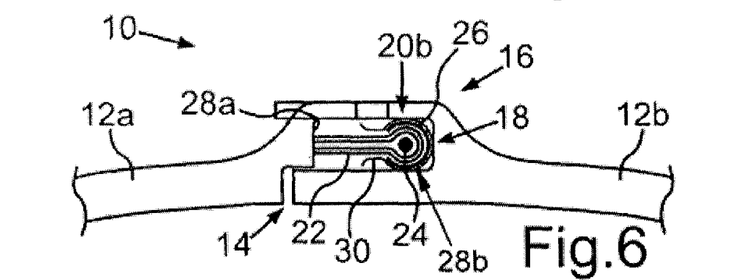
FIG. 6 is a schematic lateral sectional view of the component according to the invention in accordance with a third exemplary embodiment.

FIG. 6 shows a schematic lateral sectional view of the component 10 according to the invention in accordance with a third exemplary embodiment. The wire pack 22 of the brush seal 18 is supported on the holding element 30 and in the groove 20b. In the case of this exemplary embodiment as well, the holding element 30 may be configured as an integral constituent part of the clamping plate 26. In this case as well, this means that the clamping plate 26 exerts not just a clamping function but also a holding function for the brush seal 18 inside the groove 20b. A separate configuration of a holding element 30 is then no longer necessary. In addition, the two component segments 12a, 12b are slid on top of one another and are adjacent to each other leaving the gap 14. One can see that the groove 20b is designed so that the component segment 12a is also guided into the groove.

Figure 7:
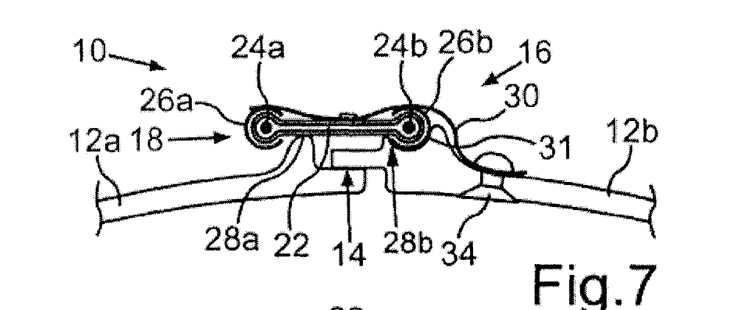
FIG. 7 is a schematic lateral sectional view of the component according to the invention in accordance with a fourth exemplary embodiment.

FIG. 7 shows a schematic lateral sectional view of the component 10 according to the invention in accordance with a fourth exemplary embodiment. On both ends, the brush seal 18 has core wires 24a, 24b, around which the wire pack 22 is wound and fixed by a clamping tube 26a, 26b, respectively. The clamping tube 26b is arranged in a corresponding depression 31 of the second component segment 12b. In addition, the brush seal 18 of the sealing device 16 rests laterally on rib-like sealing surfaces 28a, 28b of the component segments 12a, 12b. The holding element 30, which is configured as a holding plate and by means of which the brush seal 18 is fixed on the component 10, is for its part fastened on the component segment 12b by a rivet connection 34. The two component sections 12a, 12b are thus able to move relative to each other in several directions without producing a deterioration in the sealing effect.

Figure 8:
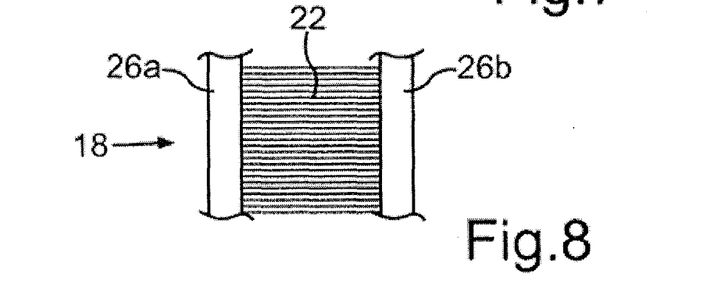
FIG. 8 is a schematic top view of a brush seal depicted in FIG. 7.

FIG. 8 shows a schematic top view of the brush seal 18 depicted in FIG. 7. Looking at FIG. 8 together with FIG. 7 shows that the wire pack 22 runs perpendicularly to the longitudinal direction of the sealing surfaces 28a, 28b.

Figure 9:
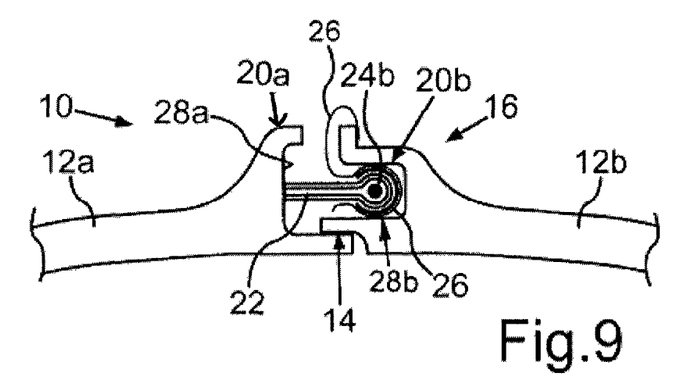
FIG. 9 is a schematic lateral sectional view of the component according to the invention in accordance with a fifth exemplary embodiment.

FIG. 9 shows a schematic lateral sectional view of the component 10 according to the invention in accordance with a fifth exemplary embodiment. In this example as well, the component segments 12a, 12b rest on each other leaving the gap 14 and include respective grooves 20a, 20b on the edges thereof. In contrast to the previous exemplary embodiments, the clamping plate 26 extends out of the groove 20b and is fixed on the component segment 12b by bending or crimping. The brush seal 18 is hereby held in the groove 20b in a structurally simple manner so that it is secured from falling out.

Figure 10:
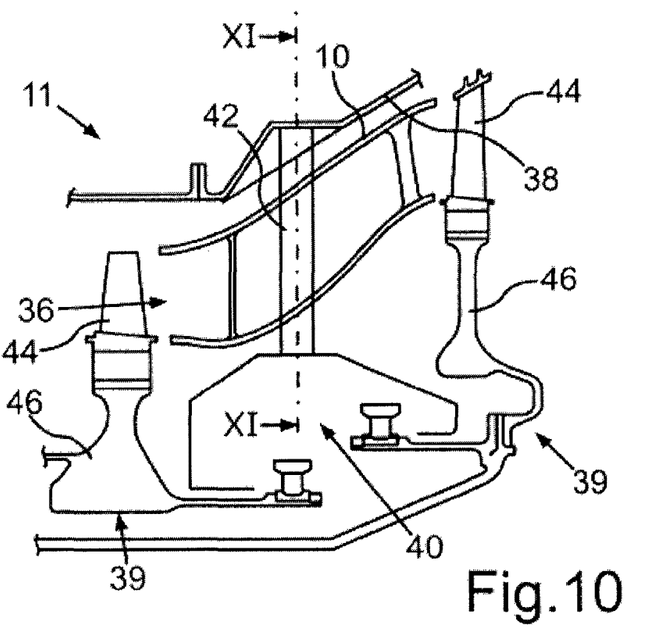
FIG. 10 is a schematic longitudinal section through a gas channel of a gas turbine.
Figure 11:
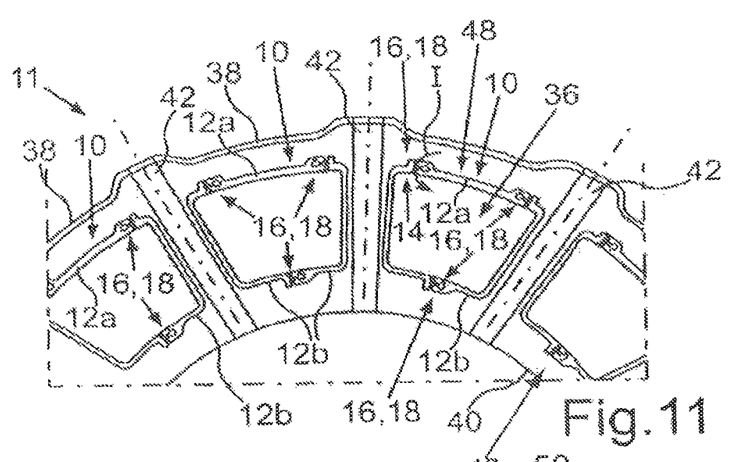
FIG. 11 is a schematic cross-section of the gas channel depicted in FIG. 10.

FIG. 10 shows a schematic longitudinal section through a gas channel 36 of a gas turbine 11 and will be explained below in conjunction with FIG. 11, in which a schematic cross-section of the gas channel 36 depicted in FIG. 10 is shown along the sectional plane XI-XI. The basic structure of the gas turbine 11 in this case is known from the prior art. The gas turbine 11 includes a housing 38, which is connected to a support chamber 40 via several struts 42. The gas channel 36 is arranged in the region of this support structure between two turbine components 39. The turbine components 39 include, among other things, rotor disks 46 provided with rotor blades 44.

As already mentioned, the gas channel 36 is formed by component segments 12a, 12b configured as panels and fairings, which are sealed against each other in pairs via sealing devices 16 composed of brush seals 18. Cooling and/or sealing air, which has a higher pressure than the hot gas flowing through the gas channel 36, is guided through the sealing air space or outer annular space 48. This makes it possible to prevent hot gas from escaping from the gas channel 36 through the gaps 14 between the component segments 12a, 12b to the outside against the flow direction identified by arrow I. Instead, because of the higher pressure thereof, the cooling and/or sealing air flows according to arrow I through the leakage points into the gas channel 36 through which hot gas flows. In the process, the sealing devices 16 ensure the lowest possible leakage flow.

Figure 12:
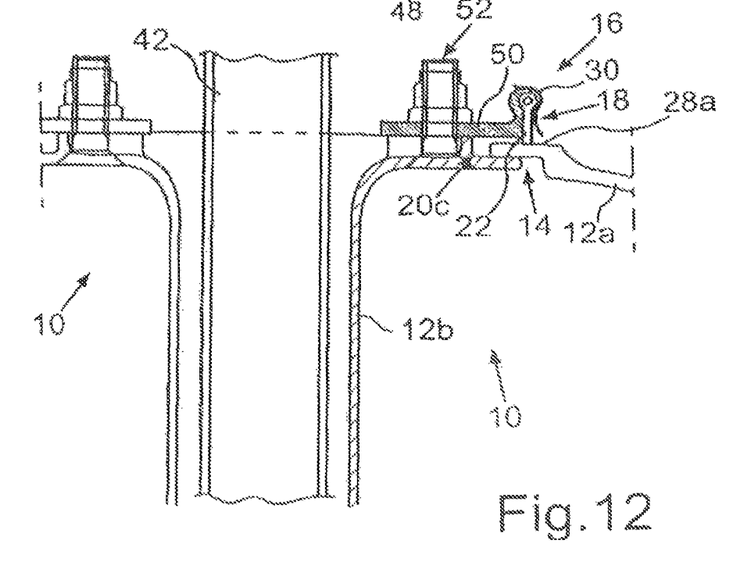
FIG. 12 is a schematic cross-section of the component according to the invention in accordance with a sixth exemplary embodiment.

FIG. 12 shows a schematic cross-section of the component 10 according to the invention in accordance with a sixth exemplary embodiment. The component 10 is illustrated in this case in context with one of the struts 42 described in the foregoing. Analogous to the components 10 depicted in FIG. 10 and FIG. 11, the component 10 includes two component segments—12a, 12b. The sealing device 16 includes a seal carrier 50, on which the brush seal 18 is radially fixed by a holding device 30. The seal carrier 50 itself is fixed on the component segment 12b via a nut-and-bolt connection 52. The seal carrier 50 together with the component segment 12b forms a groove 20c, in which the component segment 12a is arranged at least in sections. The wire ends of the wire pack 22 rest on the sealing surface 28a of the component segment 12a.

It must be emphasized that a plurality of other arrangements and combinations with respect to the arrangement and fastening of the brush seals 18 may be provided. The invention is not restricted just to the use with the components 10 described in the foregoing, but may basically be used with all segmented components 10. Segmented diffusers or guide blade segments of turbines are cited as non-exhaustive examples.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component, comprising:
   at least two component segments, wherein the component forms a gas channel in a compressor area or in a turbine area of a gas turbine and wherein the component is a gas channel wall part of the gas turbine; and
   a sealing device, wherein the sealing device includes a brush seal and a seal carrier, wherein the brush seal is fixed on the seal carrier, wherein a first one of the at least two component segments and the seal carrier form a groove in which a second one of the at least two component segments is arranged at least in a section, and wherein the second one of the at least two component segments contacts the first one of the at least two component segments.

2. The component according to claim 1, wherein the brush seal includes a wire pack that is wound around a core wire.

3. The component according to claim 2, wherein the wire pack of the brush seal is arranged at an angle of between 0° and 80° to an associated sealing surface.

4. The component according to claim 1, wherein the seal carrier is fixed on the first one of the at least two component segments.

5. The component according to claim 1, wherein the at least two component segments are slidable on top of one another.

6. The component according to claim 1, wherein the at least two component segments are movable relative to each other and wherein the brush seal seals the at least two component segments against each other.

7. A gas turbine having at least one component according to claim 1.

8. The gas turbine according to claim 7, wherein the gas turbine is an aircraft engine.

\* \* \* \* \*